Oct. 14, 1969     G. W. IRWIN     3,472,642
GLASS MOLDING APPARATUS
Filed Sept. 26, 1966     4 Sheets-Sheet 1
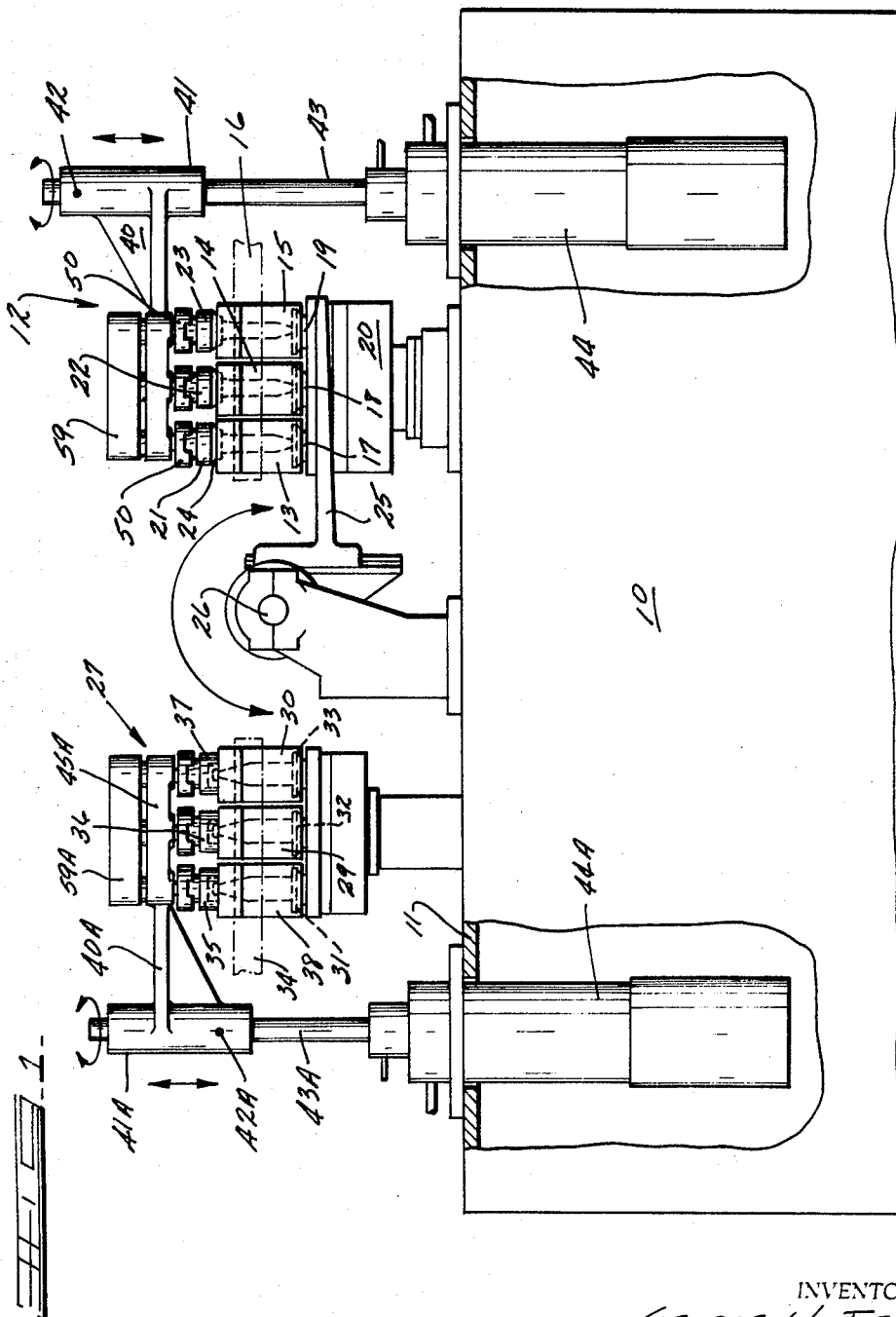
INVENTOR.
GEORGE W. IRWIN
BY J. R. Nelson and
W. A. Schaich
ATTORNEYS

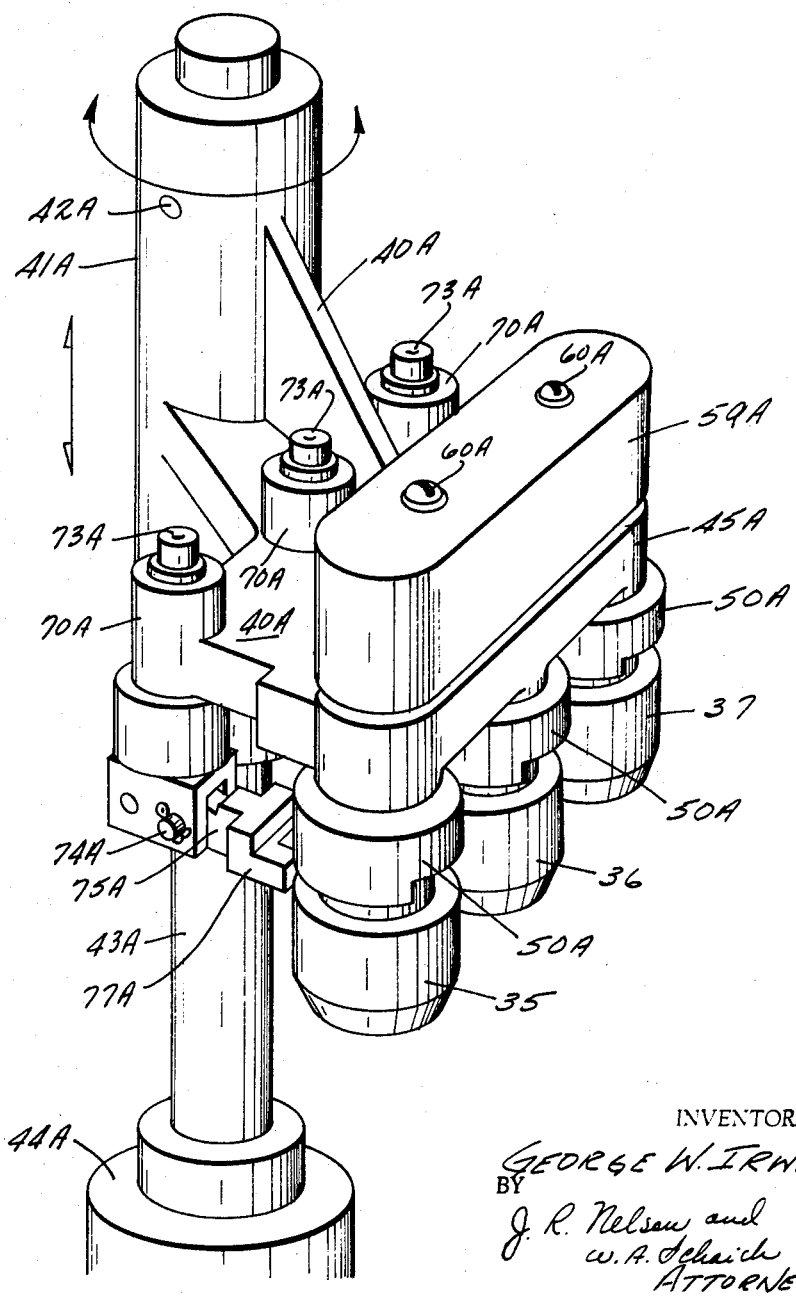

Oct. 14, 1969  G. W. IRWIN  3,472,642
GLASS MOLDING APPARATUS
Filed Sept. 26, 1966  4 Sheets-Sheet 3
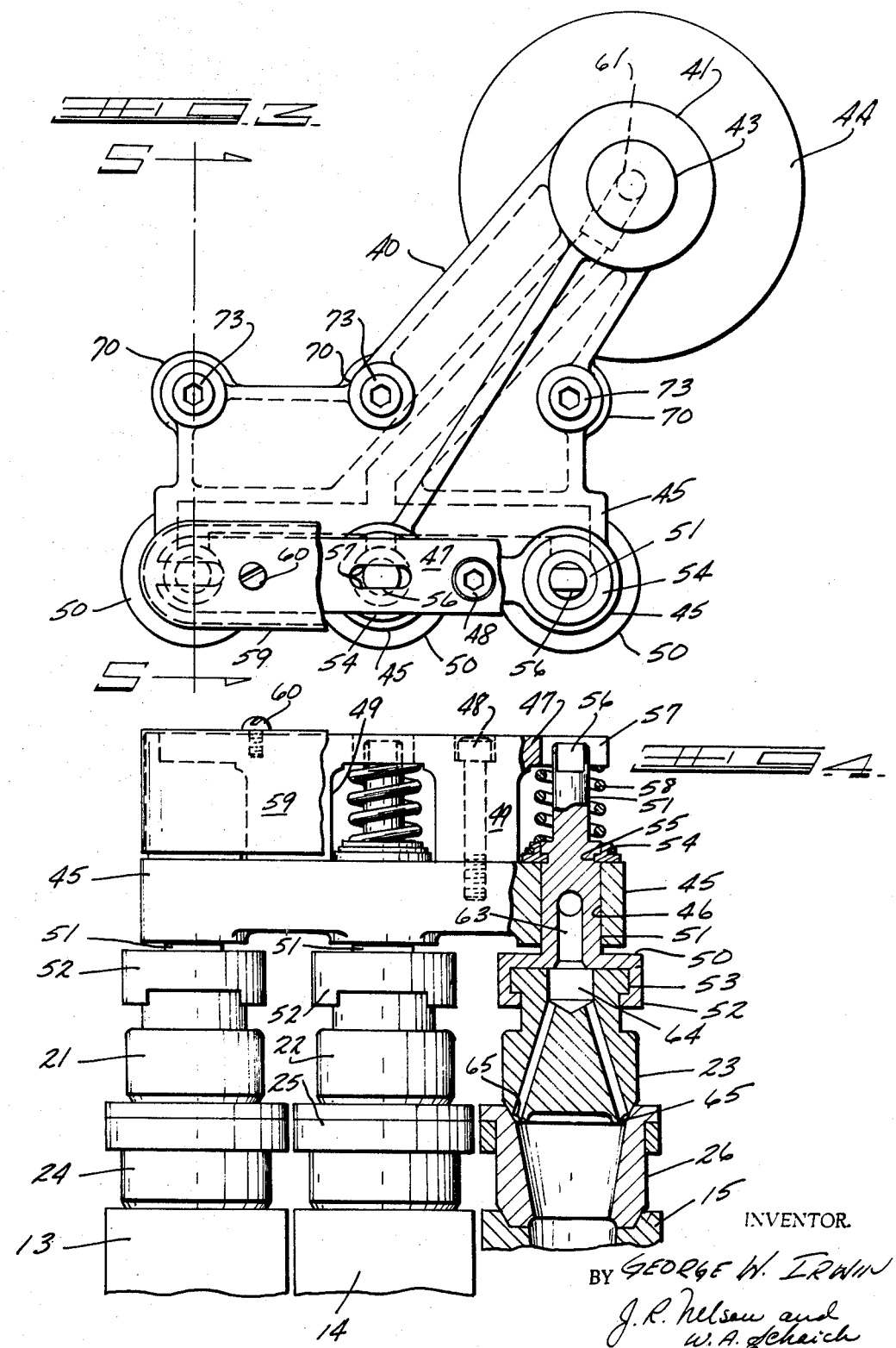
INVENTOR.
BY GEORGE W. IRWIN
J. R. Nelson and
W. A. Schaich
ATTORNEYS Oct. 14, 1969  G. W. IRWIN  3,472,642
GLASS MOLDING APPARATUS
Filed Sept. 26, 1966  4 Sheets-Sheet 4
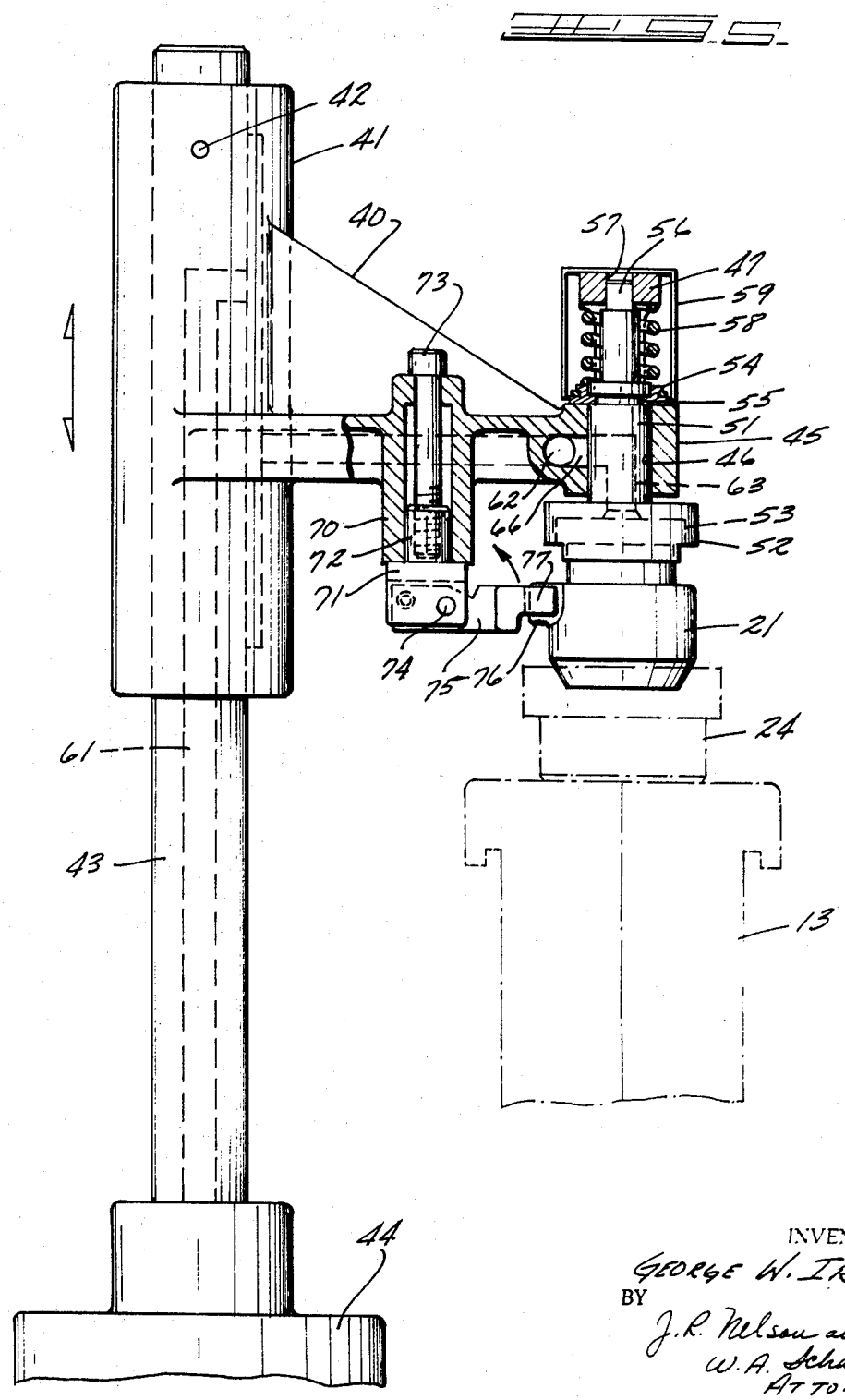
INVENTOR.
GEORGE W. IRWIN
BY
J. R. Nelson and
W. A. Schaich
ATTORNEYS

United States Patent Office 3,472,642
Patented Oct. 14, 1969

3,472,642
GLASS MOLDING APPARATUS
George W. Irwin, Holland, Ohio, assignor to Owens-Illinois, Inc., a corporation of Ohio
Filed Sept. 26, 1966, Ser. No. 582,063
Int. Cl. C03b 9/26
U.S. Cl. 65—261                    5 Claims

ABSTRACT OF THE DISCLOSURE

A glass molding apparatus employing three or more individual molding cavities in which the glass is shaped in conjunction with the cooperation of individual baffles or blow heads for covering and uncovering each upper end opening of the mold during blank and blow molding operations. The baffles and blow heads are supported and moved into position by baffle arm assembly, including individual hold-down means for each of the baffles with latch means for preventing the baffles from turning and loosening from their holders.

---

The present invention relates to glass molding apparatus, and more particularly to glass molding apparatus employing three or more individual molding cavities in which glass is shaped in conjunction with the cooperation of individual devices for covering and uncovering an end opening of the mold during the glass forming cycle.

It is desirable to increase molding speeds of present glass forming machines, such as the I.S. machine (see Ingle 1,911,119) used in industry today. To achieve this objective, it is important to increase the cavity (article forming) capacity of the individual molding sections of the machine by providing the machine sections with increased numbers of molds on each of its stations for first molding the parisons of glass at a blank molding station; and, secondly, for blowing the parisons to final articles at the final blow molding station.

The molds operated at both the blank and blow molding stations have vertically disposed molding cavities that have openings at their opposite axial ends. The lower end opening is covered by closing each of these molds about a fixed implement such as a neck mold, and neck pin, plunger and the like or a bottom plate. The upper mold opening in either the case of the blank mold or the blow mold is open and covered and uncovered during the operation of the glass forming cycles performed by devices that are moved into and out of registered engagement with the upper mold opening. It is especially significant that as the molds increase in number at either of the mentioned stations on the machine, the problem of properly operating the devices in cooperation with the several mold openings arises, whether the devices be in the form of the baffles employed at the blank molding station or the blow heads employed at the final blow molding station.

It is accordingly an object of the present invention to provide a single carriage mechanism for handling three or more devices for covering the end openings of a like number of molds and yet provide equalized seating of the devices on these molds automatically adjusting during each cycle of operation for any variation in height of the surfaces on the molds whereat the devices are to seat properly for suitable molding operation.

Another object of the invention is to provide such a carriage mechanism, as mentioned, that will maintain the devices in an aligned position on the carriage for supply of air under pressure used in the molding of the glass in the mold.

A further object of the invention is to provide such a carriage mechanism, as mentioned, that is readily adaptable for use with present day machines and present day molding cycles.

In a more specific sense, it is an object of the invention to provide a single baffle cylinder, shaft and arm in the design of the carriage mechanism that will transport a group of three baffles onto and off of three blank molds each used in the normal operating cycle of a blank molding apparatus, and yet provide equalized seating of the baffles on the mold parts in automatically compensating for mold height variations and/or sizes.

A similar and more specific object of the invention is to provide a single blow head cylinder, shaft and arm in the design of the carriage mechanism that will transport a group of three baffles onto and off of three final blow molds each used in the normal operating cycle of a blow molding apparatus, and yet provide equalized seating of the blow heads on the molds in automatically compensating for mold height variations and/or size.

The specific nature of this invention, as well as other objects and advantages thereof, will become apparent to those skilled in the art from the following detailed description taken in conjunction with the annexed sheets of drawings, in which, by way of preferred example only, are illustrated embodiments of this invention.

On the drawings:

FIG. 1 is a side elevational view of a triple gob glass forming machine, partly broken away, showing a triple blank molding apparatus and a triple final blow molding apparatus, each utilizing the present invention;

FIG. 2 is a perspective view of the blow head carriage mechanism of the present invention that is utilized in connection with the triple blow molding apparatus shown on FIG. 1;

FIG. 3 is a plan view showing the carriage mechanism of the present invention for the baffles operated in conjunction with the triple blank molding apparatus of FIG. 4, but is equally applicable to the triple final blow heads operated in conjunction with the final blow molding apparatus of FIG. 2;

FIG. 4 is an elevational view, partly in section, showing the carriage mechanism of the present invention operating three baffles on a triple blank molding apparatus; and FIG. 5 is a partially sectioned elevational view taken along lines 5—5 of FIG. 3 illustrating the carriage for the baffles of a three mold blank molding apparatus.

Referring to FIG. 1, a utility example of the present invention is illustrated, wherein the novel carriage mechanism is shown as employed on a triple mold I.S. type glass forming machine. The machine includes a base frame 10 having an upper table surface 11 upon which the elements of the machine are mounted. The machine has a blank molding station 12 whereat gobs of glass are fed to the three blank molding cavities of individual blank molds 13, 14 and 15. The molds are supported by mold arms, shown at phantom outline 16, and closed about three corresponding lower neck molds 17, 18 and 19. The blank molds each define a vertical parison forming cavity that includes opposite axial end openings. The lower end opening of each is closed by the neck molds and the underlying cooperating plungers of the known plunger mechanisms (indicated generally at 20 on FIG. 1) for operating the machine by either a blow-and-blow process or a press-and-blow process.

The opposite axial end openings of the blank mold cavities are covered by baffles 21, 22 and 23. In the blow-and-blow process, as illustrated on the drawings, these baffles are placed over funnels (for simplicity but one is indicated at 24) which are seated in the upper end openings of the molds 13, 14 and 15. The carriage mechanism for the baffles will be presently described. Prior to seating the baffles on the funnels, glass gobs were introduced into the blank mold cavities through their respective funnels, whereupon the baffles are brought onto the tops of the funnels. In the blow-and blow process, settle blow air under pressure is introduced through passages in the baffles and into the mold cavity through the funnels to shape the glass in the underlying neck molds and around the neck pins carried on the underlying plunger mechanism 20. The baffles are then lifted, the funnels are swung away from the end openings of the blank molds by means not illustrated, but well-known, and the baffles are again lowered to seat on the end openings of the blank molds and cover them. Thereafter, air pressure introduced through the neck molds and the lower axial ends of the blank cavities shape the glass to form a parison.

The neck molds 17, 18, 19 are carried on the invert arm 25 rotatable about the invert shaft 26. After the baffles are raised and the blank molds opened, the invert arm is swung to position the three formed parisons at the blow molding station 27. Here three individual final blow molds 28, 29 and 30 are closed about the parisons such that the latter are held within the blow mold cavities. The three blow mold cavities are vertically disposed having upper and lower axial end openings. The lower opening of the blow molds are closed by the stationary bottom plates 31, 32 and 33 when the blow molds are closed about them by their mold arms 34. Thereafter, the neck molds are opened, suspending the three parisons in the cavities of molds 28, 29, 30, and the invert arm rotated to return the neck molds to the blank molding station ready for the cycle to be repeated by the blank molding apparatus.

At the blow molding apparatus 27, the upper end openings of the blow mold cavities are covered by three blow heads 35, 36 and 37. The carriage mechanism for mounting the blow heads will be presently described. Air under pressure is introduced through the blow heads 35, 36, 37 simultaneously and inside the hollow parison to blow form the glass thereof, while still plastic, to the final shape of a hollow article defined by the shape of the blow mold cavities. Thereafter, the blow heads are raised from molds 28, 29, 30, the molds are opened and the molded articles are taken from the bottom plates 31, 32, 33 by conventional take-out devices (not shown).

Inasmuch as the above-described devices comprised of either baffles 21, 22, 23 or blow heads 35, 36, 37 need to be applied properly in covering the upper mold openings of the corresponding molds to assure proper application of the air pressure and forming and shaping of the glass in the molds, the present invention provides a carriage mechanism for these assuring proper alignment and seating of these devices.

It should be understood that the carriage mechanism to be described is similar in design for either device, the baffles or the blow heads. Accordingly, the present description and the appended drawings, in FIGS. 2–5, illustrate the mechanism in conjunction with baffle devices, as baffles 21, 22 and 23 shown on FIG. 1 for the blank molding apparatus. It should be understood the description applies similarly to the blow head devices and therefore on FIG. 1, the same numbers are used for similar parts, the blow head carriage mechanism having its part members followed by the letter A .

The carriage mechanism comprises a laterally disposed arm 40 integral with a journal boss 41 that is pinned at 42 onto a vertical shaft 43 of a reciprocating fluid-pressure actuated motor 44 mounted below the machine table 11 (see FIG. 1). The motor 44 includes conventional cam guide apparatus (not shown) connected to the vertical piston rod and shaft 43 to provide a rotary swinging movement to shaft 43 during a portion of the vertical reciprocating movement imparted to it by motor 44. Thus, as motor 44 is operated to provide the vertical raising and lowering movement, shaft 43 is rotated for swinging the arm 40 from a raised remote out-of-the-way position to a lowered overhead position at the top of the molds 13, 14, 15 for positioning the baffle devices on them.

Referring to FIGS. 3–5, the outer portion of the arm 40 has an integral elongated member 45 having three vertically bored bushings, each indicated as 46. Insofar as the parts hereinafter described are alike in structure, they will be indicated by the same reference numeral. These bushings 46 are aligned along the member 45 having their axial centers spaced the same as the spacing between axial centers of the underlying mold cavities of molds 13, 14, 15. An upstanding retainer bracket 47 is fastened to the upper side of member 45 by the studs 48 extending through bored holes in the vertical spacer webs 49, the studs being threadedly attached into the upper port of the member 45 of the arm. The webs 49 provide the desired spacing between the retainer bracket 47 and the member 45, as will presently become apparent, for the installation and operation of a yieldable force applying means. Each of the baffles are attached to the arm 40 by a holder 50, each holder having an upper shaft or stem 51 that is axially shiftably held in the corresponding bushings 46 of the arm. The lower end of the holder has an annular bayonet fitting 52 which provides a means for detachably attaching the baffles 21, 22, 23 by their upper bayonet flange 53. Intermediate the stem 46 is a retaining washer 54 axially positioned thereon in slot 55 of the stem. The upper end of the stem 51 is of lesser diameter and has diametrically opposed flats 56. The retainer washer 54 is carried with stem 51 and limits the downwardly extending movement of the stem 51 and its holder in bushing 46. The lower face of the retainer washer serves as a stop means for downward extension of the holder.

The upper retaining bracket 47 has elongated slots 57 which receive the flats 56 of the upper stems such that rotation of the holders and their stems is prevented. A yieldable extension means for each of the holders, in preferred form, comprises individual coil springs 58 compressed between the retaining bracket 47 and the upper face of the retaining washer 54. Thusly, the holders for baffles 21, 22, 23 are each normally extended to the position shown.

The springs 58 are enclosed by a metal casing 59 secured to the retainer bracket 47 by a screw 60.

In operation, as the baffles 21, 22, 23 are lowered to cover the openings to the blank molds 13, 14, 15 (such as shown in covering the top openings to the funnels 17, 18, 19), the surfaces that the baffles are to engage may be at different vertical elevations. Accordingly, the motor 44 is set such that it lowers the arm sufficiently for one or more of the baffles to engage an underlying molding part and thereafter provides a slight over travel in the lowering direction. To properly seat and seal all of the baffles suitably, the springs will yield in the slight lowering over travel of the carriage shaft 43 permitting each of the baffles to seat and cover the openings, thereby achieving one of the important objects of the present invention.

With reference to the blow head devices 35, 36, 37 of FIG. 2, the same is true. As the blow heads are lowered to cover the upper end openings of the blow molds 28, 29, 30 (as shown on FIG. 1), this yielding of the springs allowing some upward movement of their holders with respect to the arm member 45 will assure that each of the three blow heads seat properly in covering the blow mold openings for proper shaping operation. Should there be a variation in the vertical elevation of the blow mold surfaces that the blow heads are to engage, this will be overcome by the just described action of some of the holders in their yielding movement.

In applying air under pressure for shaping glass in the molds at the blank station 12 or the blow mold station 27, a timed control apparatus of known construction is provided as a part of the glass machine. This control opens air in a line from a pressure source connected to the passage 61 in the vertical shaft 43 of the carriage. This passage 61 connects with a lengthwise passage 62 in the carriage arm 45 (FIG. 5) and in turn connected to a bore 63 in each of the holders 50 by the branches 66. The holder bores 63 connected to an axial passage 64 in the baffles and air is introduced to the mold cavity at the tips 65 in the usual manner. The holder bores 63 are kept in alignment with the supply passage branches 66 by the flats 56 of the holder stem in the slots 57 of the retainer bracket.

It is also desirable to hold the baffle devices and blow head devices each against rotational displacement in their holders. The present invention provides a hinged latch for locking these devices in a properly aligned position. Referring to FIGS. 2 and 5, diametrically and opposite each baffle, such as 21, the carriage arm 40 includes a vertical cylinder slide holder 70. A latch pivot member 71 has a cylindrical boss 72 which fits in the slide holder 70 and is secured in place by the bolt 73. The pivot member 71 has spaced sides as a downturned U-shaped bracket and it with pivot pin 74 provide a means for hingedly mounting a forked latch member 75 that extends laterally toward the baffle 21 and along its diameter (FIG. 5). The baffle 21 has a radially extending ear or key 76 which fits intermediate the span of the fork 77 at the outer end of latch member 75. For removal of the baffle, latch member 75 may be pivoted counterclockwise on FIG. 5 to clear the key 76 for rotary movement. Upon assembly of the baffles to their holders, these latch members assure the proper rotational operating position for the device on its holders 50 of the carriage mechanism.

A similar construction is shown on FIG. 2 in individually locking the blow heads 35, 36, 37 in their aligned operating position.

Although the invention, in the foregoing description, is described in conjunction with a three mold or "triple gob" machine, the principles of the invention are applicable to apparatus utilizing more than three molds at any given molding station of the machine.

I claim:

1. A baffle carriage mechanism for a glass blank molding apparatus comprising a vertical carriage shaft, a lateral carriage arm attached to said shaft for movement thereby, at least three spaced vertical bushings in said arm, at least three baffle holders each having a stem and baffle attaching means, a baffle attached on each baffle holder, a retainer bracket overlying the carriage arm, each holder stem extending through a bushing of said arm and axially moveable therein, stop means carried by each said stem for limiting its axial movement in its said bushing in extending the baffles downwardly from the arm, yieldable extension means connected to each said stem shifting the baffles downwardly to their limit of axial movement defined by said stop means, whereby each of said baffles are independently yieldable in the opposite axial direction upon engagement with the molding apparatus, a laterally projecting, orienting key on the periphery of each said baffle, a latch member for each said baffle having a key receiving slide on one end, and means for hingedly mounting each latch member remote from its said one end, whereby each said key slide is selectively moveable into and out of guiding engagement with its corresponding orienting key of each of said baffles for holding each said baffle in axial and rotational position for recovering its said corresponding upper mold opening of the molds.

2. The mechanism defined in claim 1, wherein the yieldable extension means comprises springs individual to each said holder stem and a retainer washer fixed on said stem, each said spring being compressed between the retainer washer of said stem and the retainer bracket.

3. The mechanism defined in claim 1, wherein the retainer bracket includes a guide block having a guide aperture therein axially disposed and receiving the upper end of each said stem for sliding axial movement, each guide block aperture and adjacent end of its said stem having corresponding axial mating guide surfaces permitting only axial movement of the stem for maintaining the baffles in a non-rotatable position.

4. A blow head carriage mechanism for a glass blow molding apparatus comprising a vertical carriage shaft, a lateral carriage arm attached to said shaft for movement thereby, at least three spaced vertical bushings in said arm, at least three blow head holders each having a stem and blow head attaching means, a blow head attached on each blow head holder, a retainer bracket overlying the carriage arm, each holder stem extending through a bushing of said arm and axially moveable therein, stop means carried by each said stem for limiting its axial movement in its said bushing in extending the blow heads downwardly from the arm, yieldable extension means connected to each said stem shifting the blow heads downwardly to their limit of axial movement defined by said stop means, whereby each of said blow heads are independently yieldable upwardly upon engagement with the molding apparatus, a laterally projecting, orienting key on the periphery of each blow head, a latch member for each said blow head having a key receiving slide on one end, and means for hingedly mounting each latch member remote from its said one end, and whereby each said key slide is selectively moveable into and out of guiding engagement with its corresponding orienting key of each of said blow heads for holding each said blow head in axial and rotational position for covering its said corresponding upper mold opening of the molds.

5. A carriage mechanism for a glass molding apparatus having a plurality of molds each including an upper mold cavity opening comprising a vertical carriage shaft, a lateral carriage arm attached to said shaft for movement thereby, a plurality of vertical bushings in said arm, a plurality of devices for covering each said mold cavity openings, a like plurality of holders for said devices each having a stem and means for attaching one of said devices thereon, a retainer bracket overlying the carriage arm, each stem extending through a bushing of said arm and axially shiftable therein, stop means carried by each said stem for limiting its axial movement in its said bushing in extending the devices downwardly from the arm, yieldable extension means connected to each said stem shifting said devices downwardly to their limit of axial movement defined by said stop means, whereby each of said devices are independently yieldable upwardly upon engagement wtih the molds, a laterally projecting, orienting key on the periphery of each said device, a latch member for each said device having a key receiving slide on one end, and means for hingedly mounting each latch member remote from its said one end, whereby each said key slide is selectively moveable into and out of guiding engagement with its corresponding orienting key of each of said devices for holding each said device in axial and rotational position for covering its said corresponding upper mold opening of the molds.

References Cited

UNITED STATES PATENTS

| | | | |
|---|---|---|---|
| 1,914,155 | 6/1933 | Peiler | 65—261 X |
| 3,189,427 | 6/1965 | Schrim | 65—323 |

FOREIGN PATENTS 637,025  10/1936  Germany.

S. LEON BASHORE, Primary Examiner
ARTHUR D. KELLOGG, Assistant Examiner

U.S. Cl. X.R.
65—232, 307, 323